United States Patent
Seo et al.

(10) Patent No.: US 9,590,780 B2
(45) Date of Patent: Mar. 7, 2017

(54) METHOD AND APPARATUS FOR TRANSMITTING AND RECEIVING DOWNLINK SIGNALS IN WIRELESS COMMUNICATION SYSTEMS

(71) Applicant: LG ELECTRONICS INC., Seoul (KR)

(72) Inventors: Inkwon Seo, Anyang-si (KR); Seungmin Lee, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 79 days.

(21) Appl. No.: 14/390,888

(22) PCT Filed: Apr. 9, 2013

(86) PCT No.: PCT/KR2013/002956
§ 371 (c)(1),
(2) Date: Oct. 6, 2014

(87) PCT Pub. No.: WO2013/154327
PCT Pub. Date: Oct. 17, 2013

(65) Prior Publication Data
US 2015/0071208 A1    Mar. 12, 2015

Related U.S. Application Data

(60) Provisional application No. 61/622,012, filed on Apr. 10, 2012, provisional application No. 61/751,246, filed on Jan. 10, 2013.

(51) Int. Cl.
*H04L 5/00* (2006.01)
*H04W 72/04* (2009.01)
*H04L 5/14* (2006.01)

(52) U.S. Cl.
CPC ........... *H04L 5/0048* (2013.01); *H04L 5/005* (2013.01); *H04L 5/0051* (2013.01); *H04L 5/1469* (2013.01); *H04W 72/04* (2013.01)

(58) Field of Classification Search
None
See application file for complete search history.

(56) References Cited

U.S. PATENT DOCUMENTS

2009/0249153 A1    10/2009    Zhang
2012/0230232 A1*   9/2012    Ji ........................ H04B 7/2656
                                                          370/280

(Continued)

OTHER PUBLICATIONS

Alcatel-Lucent et al., "CC-specific TDD configuration for enhanced CA in Rel-11", 3GPP TSG RAN WG1 Meeting #66, Aug. 22-26, 2011, R1-112408, pp. 1-4.

(Continued)

*Primary Examiner* — Diane Lo
(74) *Attorney, Agent, or Firm* — Birch, Stewart, Kolasch & Birch, LLP

(57) ABSTRACT

The present invention relates to a method for a base station to transmit a downlink signal in a wireless communication system, including the step of transmitting information related to a downlink subframe, wherein the information related to the downlink subframe is a subframe set for uplink transmission.

13 Claims, 9 Drawing Sheets

(a)

(b)

(56) References Cited

U.S. PATENT DOCUMENTS

| | | | | |
|---|---|---|---|---|
| 2013/0194940 A1* | 8/2013 | Li | ........................ | H04J 11/0023 |
| | | | | 370/252 |
| 2013/0194982 A1* | 8/2013 | Fwu | .................... | H04W 72/085 |
| | | | | 370/280 |
| 2013/0272170 A1* | 10/2013 | Chatterjee | ............. | H04W 28/02 |
| | | | | 370/280 |
| 2014/0071934 A1* | 3/2014 | Frenne | .................... | H04L 5/001 |
| | | | | 370/330 |

OTHER PUBLICATIONS

Ericsson et al., "Specification impact of TDD traffic adaptation", 3GPP TSG-RAN WG1 #68bis, Mar. 26-30, 2012, R1-121709, pp. 1-3.

LG Electronics, "Issues in Further Enhancements to LTE TDD", 3GPP TSG RAN WG1 Meeting #68bis, Mar. 26-30, 2012, R1-121461, pp. 1-4.

Pantech, "PUSCH HARQ/scheduling timing in inter-band CA with different TDD UL-DL configuration", 3GPP TSG RAN1 #68bis, Mar. 26-30, 2012, R1-121357, pp. 1-5.

\* cited by examiner

FIG. 5
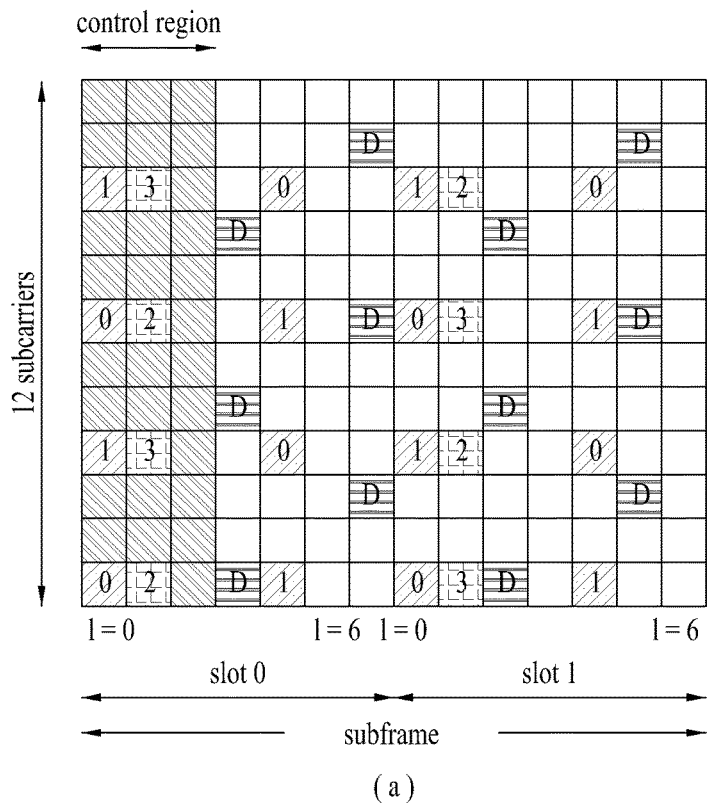
(a)
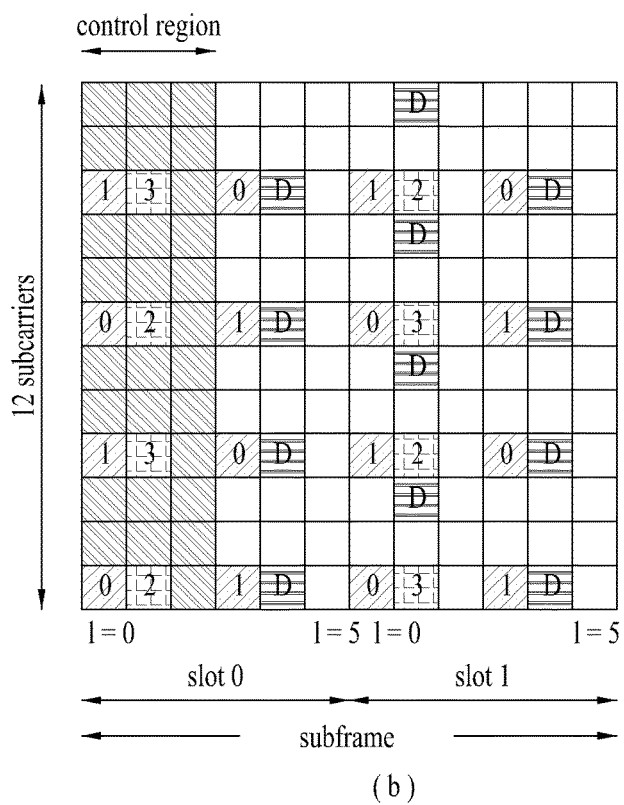
(b)

MeNB : macro eNodeB
PeNB : pico eNodeB
FeNB : femto eNodeB

MUE : macro UE
PUE : pico UE
FUE : femto eNodeB

FIG. 7
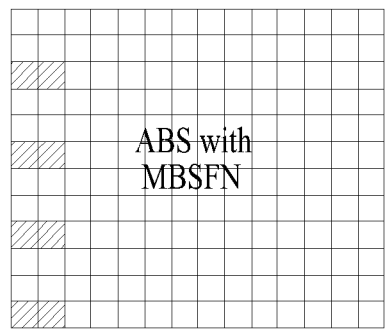
(a)
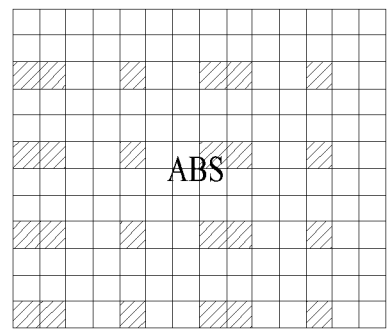
(b)

METHOD AND APPARATUS FOR TRANSMITTING AND RECEIVING DOWNLINK SIGNALS IN WIRELESS COMMUNICATION SYSTEMS

CROSS REFERENCE TO RELATED APPLICATIONS

This application is the National Phase of PCT International Application No. PCT/KR2013/002956, filed on Apr. 9, 2013, which claims priority under 35 U.S.C. 119(e) to U.S. Provisional Application No. 61/622,012, filed on Apr. 10, 2012, and U.S. Provisional Application No. 61/751,246, filed on Jan. 10, 2013, all of which are hereby expressly incorporated by reference into the present application.

TECHNICAL FIELD

Following description relates to a wireless communication system. More particularly, in case of transmitting a downlink signal via a subframe configured for the transmission, following description relates a method of signaling information on the transmission and an apparatus therefor.

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF THE INVENTION

Technical Task

In case of transmitting a downlink signal via a subframe configured for uplink transmission in a TDD (time division duplex) system, the present invention discloses a method of modifying related configuration and technologies related to signaling of information related to the modification. Technical tasks obtainable from the present invention are non-limited the above-mentioned technical task. And, other unmentioned technical tasks can be clearly understood from the following description by those having ordinary skill in the technical field to which the present invention pertains.

Technical Solution

According to a first technical aspect of the present invention, a method of transmitting a downlink signal, which is transmitted by an eNode B in a wireless communication system, includes the steps of transmitting information associated with a downlink subframe and transmitting a downlink signal via a subframe configured for uplink transmission, wherein the information associated with the downlink subframe corresponds to information used for the subframe configured for the uplink transmission.

According to a second technical aspect of the present invention, an eNode B device in a wireless communication system includes a transmission module and a processor, the processor configured to transmit information associated with a downlink subframe, the processor configured to transmit a downlink signal via a subframe configured for uplink transmission, wherein the information associated with the downlink subframe corresponds to information used for the subframe configured for the uplink transmission.

The first to the second technical aspect of the present invention can include all/a part of the configurations disclosed in the following.

The information associated with the downlink subframe can include information indicating whether a cell-specific reference signal is transmitted in case of transmitting the downlink signal in the subframe configured for the uplink transmission.

Whether the subframe is configured for the uplink transmission is indicated to a user equipment via a system information block and the subframe to which the downlink signal is transmitted and configured for the uplink transmission may correspond to a subframe capable of being configured as an MBSFN (multimedia broadcast single frequency network) subframe.

The information associated with the downlink subframe can include antenna port information of a cell-specific reference signal, which is transmitted in case of transmitting the downlink signal in the subframe configured for the uplink transmission.

The antenna port information may correspond to a subset of antenna port information of a cell-specific reference signal transmitted in a subframe configured for downlink transmission.

The information associated with the downlink subframe may include a PDSCH to RS power ratio.

The PDSCH to RS power ratio may correspond to a value greater than a PDSCH to RS power ratio in a subframe configured for downlink transmission.

The information associated with the downlink subframe can include subframe set information used for interference measurement of a user equipment, which has received the downlink signal.

The subframe set information may correspond to a set of subframes used for downlink transmission and configured for the uplink transmission.

The information associated with the downlink subframe may include at least one of a transmission mode for transmitting the downlink signal and a MCS (modulation and coding scheme) in the subframe configured for the uplink transmission.

A UE-specific reference signal overhead in the subframe configured for the uplink transmission can be determined based on a rank of a subframe used for transmitting a downlink signal among subframes configured for uplink transmission prior to the subframe configured for the uplink transmission.

The information associated with the downlink subframe can be transmitted in a downlink subframe prior to the subframe configured for the uplink transmission where the downlink signal is transmitted.

The information associated with the downlink subframe can be transmitted via upper layer signaling.

Advantageous Effects

According to the present invention, a user equipment can reliably receive a signal while transmitting a downlink signal in a subframe configured for uplink transmission although configuration related to signal transmission is modified.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for explaining a reference signal;

FIG. 7 is a diagram for explaining an ABS (almost blank subframe) among inter-cell interference coordination;

BEST MODE

Mode for Invention

Figure 1:
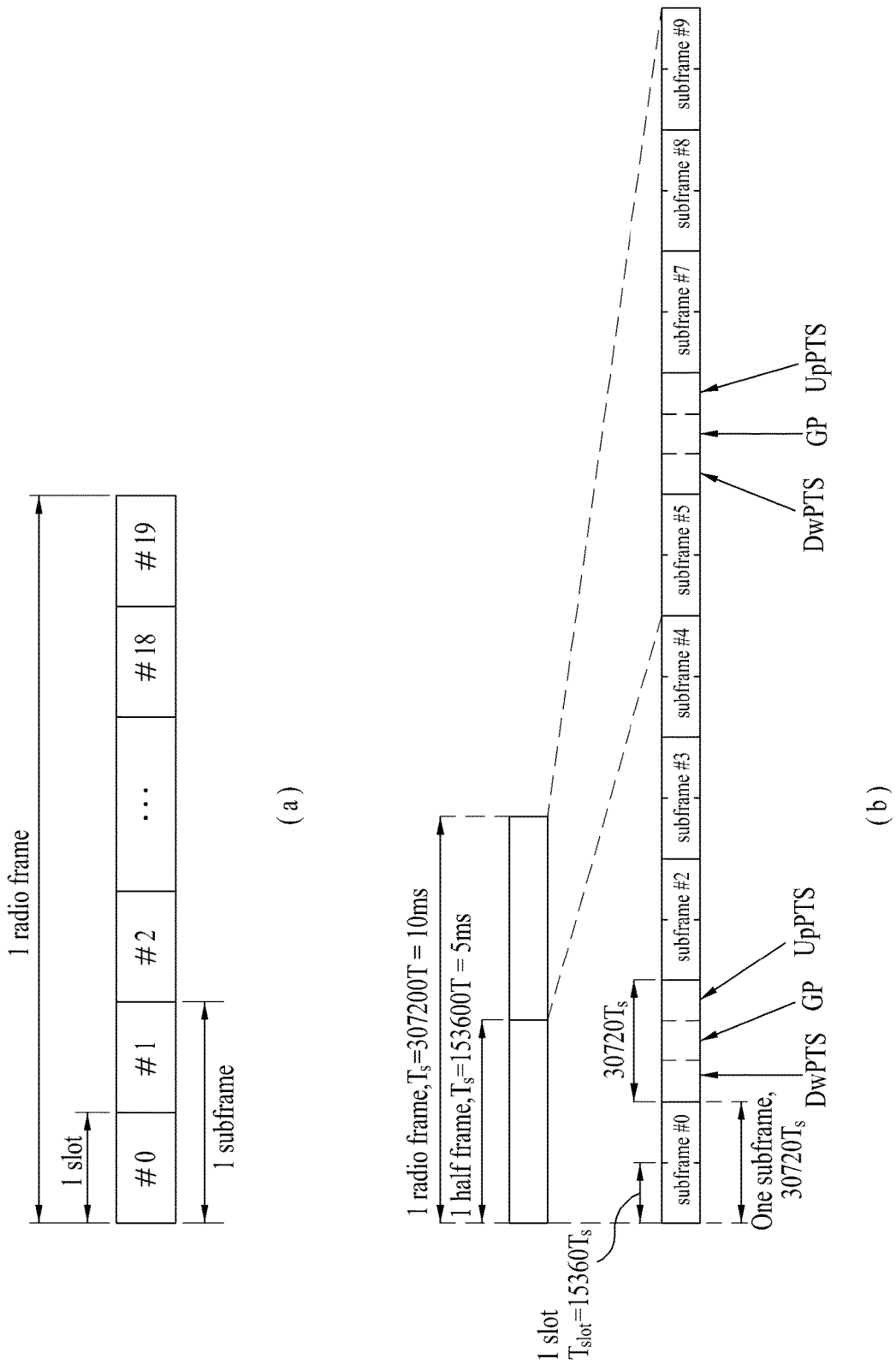
FIG. 1 is a diagram of a structure of a radio frame.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

LTE/LTE-A Resource Structure/Channel

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or channel estimation in a user equipment. The UpPTS is used for channel estimation in a base station and matching a uplink transmission synchronization of a user equipment. The guard period is a period for eliminating interference generated in uplink due to multi-path delay of a downlink signal between uplink and downlink. Meanwhile, one subframe includes two slots irrespective of a type of a radio frame. The above-described structures of the radio frame are exemplary only. And, the number of subframes included in a radio frame, the number of slots included in the subframe and the number of symbols included in the slot may be modified in various ways.

Figure 2:
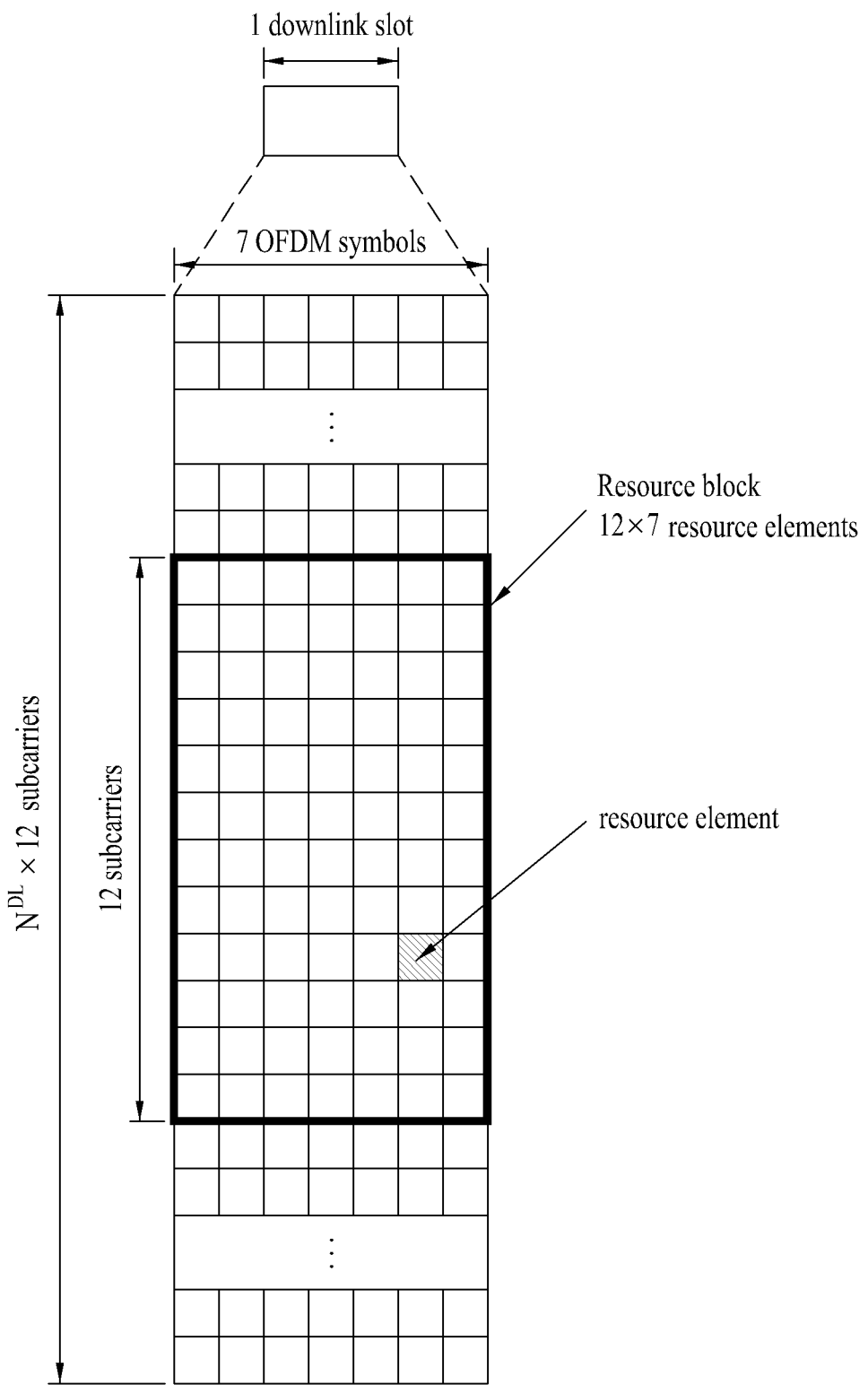
FIG. 2 is a diagram of a resource grid for a downlink (DL) slot.

FIG. 2 is a diagram of a resource grid for a downlink (DL) slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
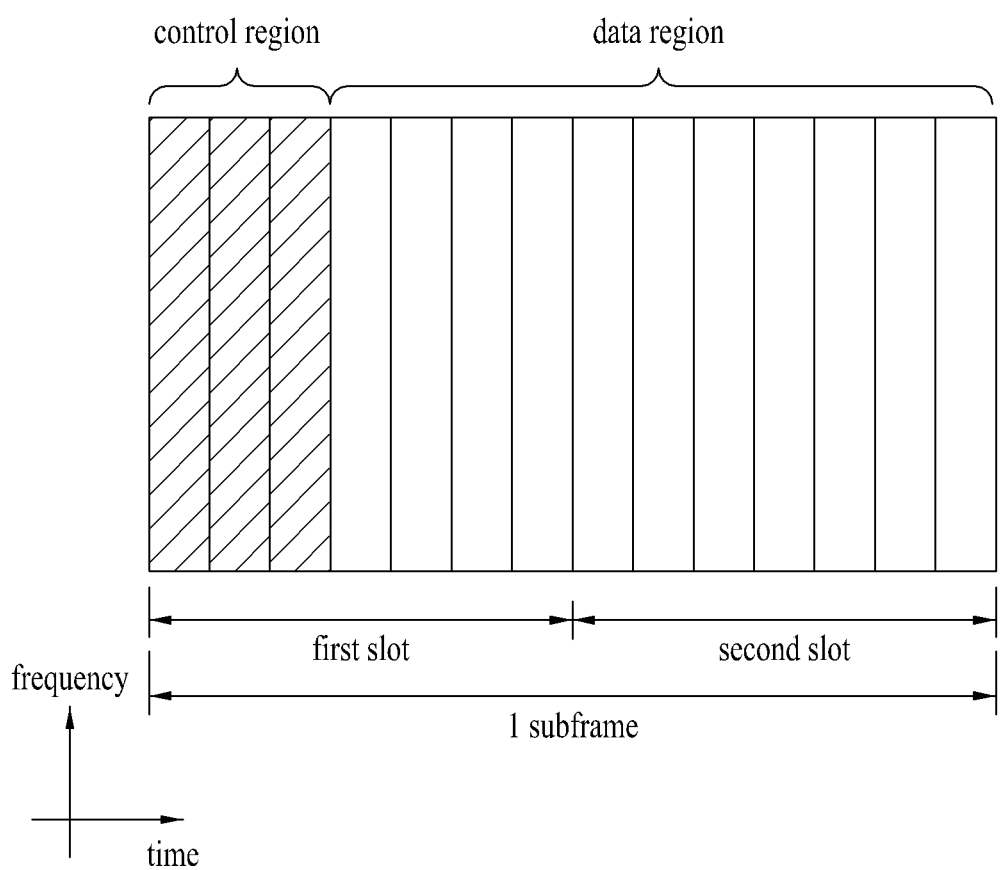
FIG. 3 is a diagram for a structure of a downlink (DL) subframe.

FIG. 3 is a diagram for a structure of a downlink (DL) subframe. Maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL resource allocation information, DL resource allocation information or a UL transmit power control command for a random UE (user equipment) group. PDCCH is able to carry resource allocation and transmission format of DL-SCH (downlink shared channel), resource allocation information of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
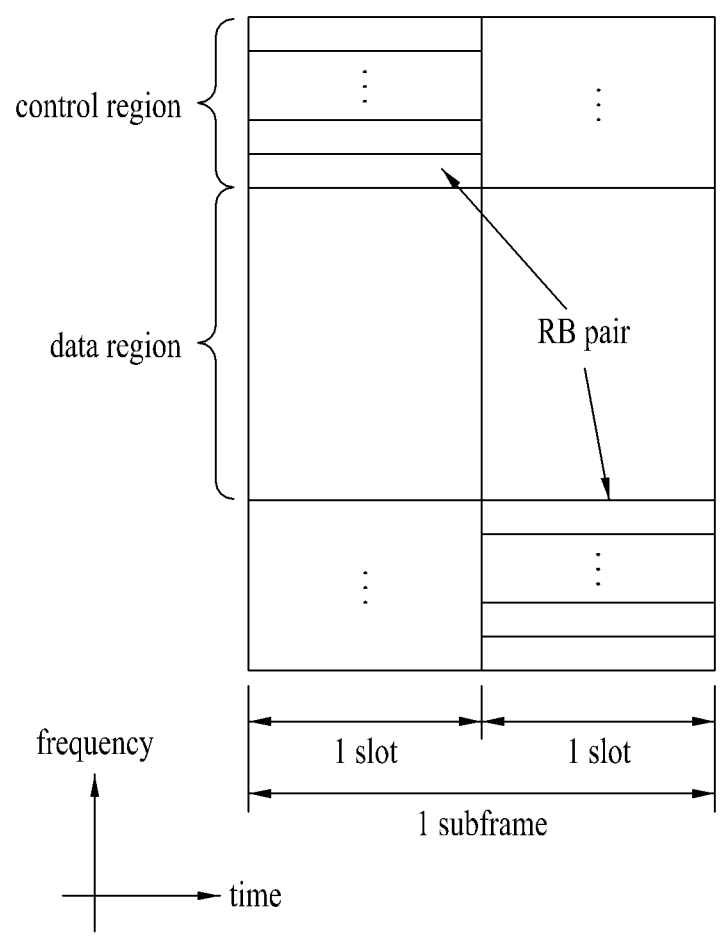
FIG. 4 is a diagram for a structure of an uplink (UL) subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Reference Signal (RS)

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both of a transmitting end and the receiving end is transmitted and finds out the channel information with the extent of distortion when the signal is received on a channel. The signal is called a pilot signal or a reference signal.

When a data is transmitted/received using MIMO antenna, it may be preferable that a channel state between a transmitting antenna and a receiving antenna is detected in order for a receiving end to correctly receive the data. Hence, a separate reference signal should exist according to each transmitting antenna, specifically, each antenna port.

A reference signal can be classified into an uplink reference signal and a downlink reference signal. In a current LTE system, the uplink reference signal includes:

i) a DM-RS (demodulation-reference signal) for channel estimation to coherently demodulate information transmitted on PUSCH and PUCCH ii) an SRS (sounding reference signal) used for an eNode B to measure UL channel quality on a frequency of different network.

Meanwhile, the downlink reference signal includes:

i) a cell-specific reference signal (CRS) shared by all user equipments in a cell ii) a UE-specific reference signal used for a specific user equipment iii) a DM-RS (demodulation-reference signal) transmitted for coherent demodulation in case of transmitting PDSCH iv) a CSI-RS (channel state information-reference signal) used for delivering CSI (channel state information) in case of transmitting a downlink DMRS v) an MBSFN reference signal transmitted to coherently demodulate a signal transmitted in MBSFN (multimedia broadcast single frequency network) mode vi) a positioning reference signal used for estimating geographical location information of a user equipment.

A reference signal (RS) is mainly classified into two types in accordance with a purpose of the RS. One type of the RS is used to obtain channel information and another type of the RS is used to demodulate data. Since the former one is the RS to make a UE obtain DL channel information, it is transmitted in wideband. Although a UE does not receive DL data in a specific subframe, the UE should receive and measure the corresponding RS. This sort of RS can also be used for performing a measurement for a handover and the like. In case that a base station transmits a resource in DL, the latter one corresponds to an RS transmitted together with the resource. A UE can perform channel estimation by receiving the RS and may be then able to demodulate data. This sort of RS should be transmitted to a region to which the data is transmitted.

A CRS is used for two purposes including channel information acquisition and data demodulation. On the contrary, a UE-specific reference signal is used for a purpose of data demodulation only. The CRS is transmitted in every subframe for a wideband. The CRS for maximum 4 antenna ports can be transmitted according to the number of transmitting antennas of a base station. For instance, if the number of antenna ports of the base station corresponds to 2, a CRS for $0^{th}$ antenna port and a CRS for $1^{st}$ antenna port are transmitted. If the number of antenna ports of the base station corresponds to 4, CRSs for 0 to $3^{rd}$ antenna port are transmitted, respectively.

FIG. 5 is a diagram for patterns that a CRS and a DRS defined by a legacy 3GPP LTE system (e.g., release-9) are mapped to a downlink resource block (RB) pair. The downlink RB pair as a reference signal mapping unit can be represented by a unit of 'one subframe in time domain×12 subcarriers on frequency domain' In particular, one RB pair has a length of 14 OFDM symbols in case of a normal CP (FIG. 5 (a)) and a length of 12 OFDM symbols in case of an extended CP (FIG. 5 (b)) in time domain. FIG. 5 shows a position of a reference signal on RB pairs in a system where a base station supports 4 transmission antennas. In FIG. 5, resource elements (RE) represented as '0', '1', '2', and '3' indicate a position of the CRS for an antenna port 0, 1, 2, and 3, respectively. Meanwhile, a resource element represented as 'D' in FIG. 5 indicates a position of a DM-RS.

Heterogeneous Network Environment (Heterogeneous Deployments)

Figure 6:
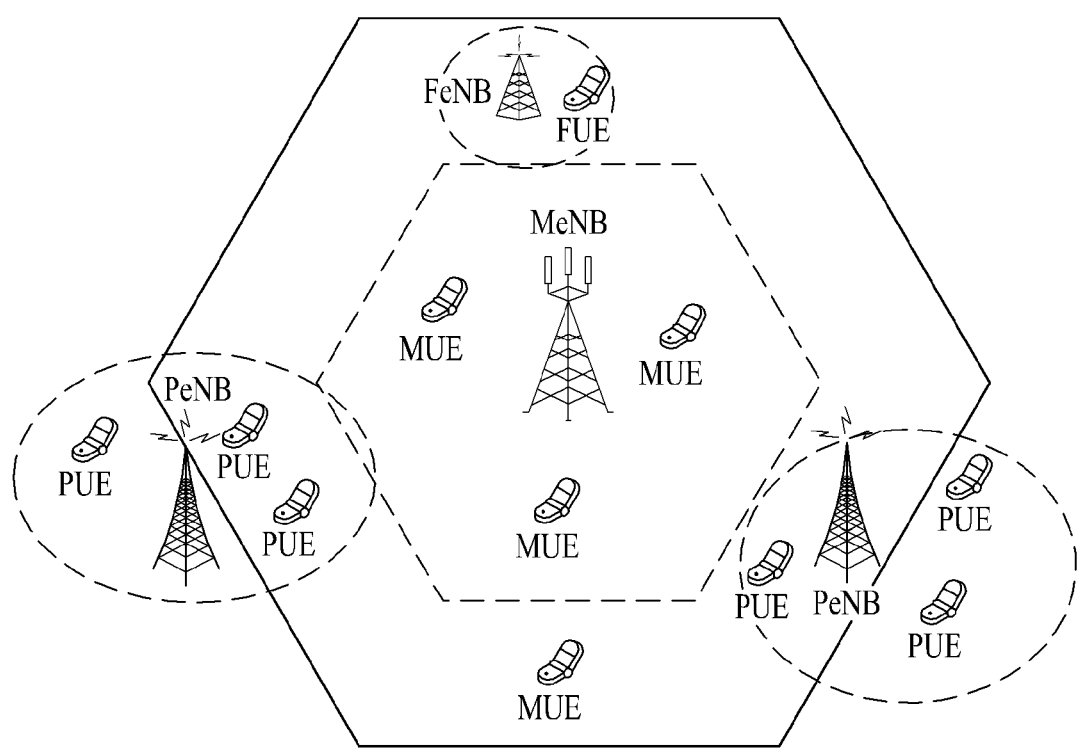
FIG. 6 is a diagram for explaining a heterogeneous network environment.

FIG. 6 is a diagram of a heterogeneous network wireless communication system including a macro base station (MeNB) and a micro base station (PeNB or FeNB). In this specification, a terminology of a heterogeneous network means a network in which the macro base station (MeNB) and micro base stations (PeNB or FeNB) co-exist although an identical Radio Access Technology (RAT) is used. The macro base station (MeNB) indicates a general base station of a wireless communication system having a wide coverage and high transmit power. The macro base station (MeNB) may also be called a macro cell.

For instance, the micro base station (PeNB or FeNB) can be called a micro cell, a pico cell, a femto cell, a home eNB (HeNB), a relay, or the like (the exemplified micro base station and the macro base station can be commonly called a transmission point). The micro base station (PeNB or FeNB) is a small version of the macro base station (MeNB) and can operate independently in a manner of performing most of functions of the macro base station. The micro base station is a sort of base stations installed (overlay) in an area covered by the macro base station or the base stations installable (non-overlay) in a radio shadow area where the macro base station is not able to cover. Compared to the macro base station (MeNB), the micro base station (PeNB or FeNB) can accommodate small numbers of user equipments with a narrower coverage and lower transmit power.

A user equipment (hereinafter called a macro UE) can be directly served from the macro base station (MeNB) and a user equipment (hereinafter called a micro UE) can be served from the micro base station (PeNB or FeNB) as well. In some cases, the user equipment (PUE) existing in the coverage of the micro base station (MeNB) may be served from the macro base station (MeNB).

According to whether an access restriction is applied to a user equipment, the micro base station can be classified into two types.

A first type corresponds to an OSG (Open access Subscriber Group) or non-CSG (Closed access subscriber Group) base station. The first type base station corresponds to a cell that permits an access of a legacy macro-UE or a micro-UE of a different micro base station. The legacy macro-UE and the like may perform a handover to a base station of the OSG type.

A second type corresponds to a CSG base station. The CSG base station does not permit an access of a legacy macro-UE or a micro-UE of a different micro base station. Hence, a handover to the CSG base station is not feasible.

Inter-Cell Interference Coordination (ICIC)

In the aforementioned heterogeneous network and/or CoMP environment, interference between cells adjacent to each other may cause a problem. In order to solve the problem of inter-cell interference, inter-Cell interference coordination (ICIC) can be applied.

As an example of the ICIC applied to a frequency resource, 3GPP LTE release-8 system divides a given whole frequency domain (e.g., system bandwidth) into one or more sub domains (e.g., physical resource block (PRB) unit) and defines a method of exchanging an ICIC message for each of the frequency sub domains between cells. For instance, as the information included in the ICIC message for the frequency resource, relative narrowband transmission power (RNTP) related to a DL transmit power is defined and UL interference overhead indication (IOI) related to UL interference, UL high interference indication (HII), and the like are defined in the 3GPP LTE release-8 system.

The RNTP is the information indicating DL transmit power used by a cell transmitting an ICIC message on a specific frequency sub domain. For instance, if an RNTP field for the specific frequency sub domain is set to a first value (e.g., 0), it may mean that the DL transmit power of a corresponding cell does not exceed a prescribed threshold on the corresponding frequency sub domain. Or, if the RNTP field for the specific frequency sub domain is set to a second value (e.g., 1), it may mean that the corresponding cell cannot promise the DL transmit power on the corresponding frequency sub domain. In other word, if the value of the RNTP field corresponds to 0, the DL transmit power of the corresponding cell can be considered as low. Yet, if the value of the RNTP field corresponds to 1, the DL transmit power of the corresponding cell cannot be considered as low.

The UL IOI is the information indicating an amount of UL interference experienced (or received) by a cell transmitting an ICIC message on the specific frequency sub domain. For instance, if an IOI field for the specific frequency sub domain is set to a value corresponding to a large amount of interference, it may mean that the corresponding cell is experiencing strong UL interference on the frequency sub domain. Having received the ICIC message, the cell can schedule a user equipment using low transmit power among the user equipments served by the cell on the frequency sub domain corresponding to the IOI indicating strong UL interference. By doing so, since the user equipments perform UL transmission with a low transmit power on the frequency sub domain corresponding to the IOI indicating the strong UL interference, the UL interference experienced by a neighboring cell (i.e., the cell transmitted the ICIC message) can be reduced.

The UL HII is the information indicating an extent of interference (or, UL interference sensitivity) capable of being occurred by a UL transmission for a corresponding frequency sub domain in a cell transmitting the ICIC message. For instance, if a HII field is set to a first value (e.g., 1) for a specific frequency sub domain, it may mean that the cell transmitting the ICIC message is likely to schedule a user equipment of a strong UL transmit power for the corresponding frequency sub domain. On the other hand, if the HII field is set to a second value (e.g., 0) for the specific frequency sub domain, it may mean that the cell transmitting the ICIC message is likely to schedule a user equipment of a weak UL transmit power for the corresponding frequency sub domain. Meanwhile, having received the ICIC message, the cell preferentially schedules a user equipment for the frequency sub domain where the HII field is set to the second value (e.g., 0) and schedules a user equipment capable of well operating despite of strong interference for the frequency sub domain where the FII field is set to the first value (e.g., 1), thereby avoiding the interference from the cell in which the ICIC message is transmitted.

Meanwhile, as an example of an ICIC for the time resource, 3GPP LTE-A system (or 3GPP LTE release-10 system) divides a given whole time domain into one or more sub domains (e.g., subframe unit) and defines a method of exchanging whether each of the time sub domains is silent between cells. The cell transmitting an ICIC message can deliver the information indicating that a silencing is performed in a specific subframe to neighbor cells and does not schedule PDSCH or PUSCH in the corresponding subframe. Meanwhile, a cell receiving the ICIC message can schedule UL and/or DL transmission for a user equipment in the subframe where the silencing is performed in the cell in which the ICIC message is transmitted.

The silencing may mean that a specific cell does not perform (or performs transmission of 0 or weak power) an operation of most of signal transmission in UL and DL in a specific subframe. As an example of the silencing operation, the specific cell can configure the specific subframe as 'ABS with MBSFN' (almost blank subframe (ABS) with multicast broadcast single frequency network (MBSFN)). As depicted in FIG. 7 (a), in a DL subframe configured as the 'ABS with MBSFN' subframe, a signal is transmitted in a control region only and a signal is not transmitted in a data region. As a different example of the silencing operation, an interfering cell can configure a specific subframe as ABS (almost blank subframe). As depicted in FIG. 7 (b), the ABS means a subframe transmitting a CRS only in the control region and the data region of the DL subframe and the subframe not transmitting (or transmission of weak power is performed only) other control information and data in the control region and the data region of the DL subframe. Yet, such a DL channel as a PBCH, a PSS, an SSS and the like and a DL signal can be transmitted in the ABS. As mentioned in the foregoing description, the silencing can be performed in a specific subframe unit and information indicating whether the silencing is performed can be called an ABS subframe pattern (hereinafter called ABS. Unless specifically mentioned, it may be comprehended as the ABS corresponds to either the aforementioned 'ABS with MBSFN' or the 'ABS').

In relation to the ABS, ABS-related signaling regulated by a current 3GPP LTE-A standard is mainly classified into ABS information and ABS status. First of all, the ABS information correspond to information indicating a subframe to be used as the ABS by a bitmap. In case of FDD, the ABS information is configured by a bitmap of 40 bits. In case of TDD, the ABS information is configured by a bitmap of maximum 70 bits although it varies depending on a UL-DL configuration. The ABS information is explained with an example of a case of FDD in the following. The 40 bits indicate 40 subframes. If a bit value corresponds to 1, it indicates an ABS. if a bit value corresponds to 0, it indicates a non-ABS. When a limited measurement is set to a user equipment, it indicates the number of CRS antenna ports of a corresponding cell to measure a CRS. And, a measurement subset corresponds to a subset of ABS pattern information.

In case of FDD, the measurement subset is configured by a bitmap of 40 bits. In case of TDD, the measurement subset is configured by a bitmap of maximum 70 bits. The measurement subset can be comprehended as a recommendation of a sort of limited measurement to set a limited measurement to a user equipment. An information element of the ABS status is used for the purpose of helping an eNB determine whether to change an ABS pattern.

Switching of UL Subframe to DL Subframe

The aforementioned TDD is explained again with reference to FIG. 1. In LTE/LTE-A system, each subframe (except a special subframe for switching between UL-DL) of a type 2 radio frame of TDD is configured to be used for either UL or DL in advance. For instance, referring to Table 1 in the following, in case of a UL-DL configuration 0, a $0^{th}$ subframe and a $5^{th}$ subframe of a radio frame are configured in advance to be used for DL and a $2^{nd}$, a $3^{rd}$, a $4^{th}$, a $7^{th}$, a $8^{th}$ and $9^{th}$ subframe are configured in advance to be used for UL.

A UL-DL configuration to be used by a specific eNode B can be provided to a user equipment as a part (e.g., system information block (SIB)) of system information. And, it may compel neighboring eNode Bs to use an identical TDD configuration, i.e., UL-DL configuration, due to such a reason as interference and the like.

TABLE 1

| UL-DL configuration | Switching interval from DL to UL | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |

(D: a subframe used for DL transmission,
U: a subframe used for UL transmission,
S: a special subframe)

When a system is managed according to the UL-DL configuration shown in Table 1, if the amount of data transmitted from each cell in UL or DL is rapidly increasing, one or more subframes configured for the UL can be used in a manner of being changed to subframes configured for the DL to smoothly transmit the data. On the contrary, one or more subframes configured for the DL can be used in a manner of being changed/switched to subframes configured for the UL to smoothly transmit the data. In the following description, among the subframes configured for the UL transmission, a subframe used for transmitting a DL signal is called a UD subframe, a subframe configured for the UL transmission is called a UL subframe (i.e., the UL subframe corresponds to UL in a configuration on SIB and the subframe actually transmitted in UL) and a subframe configured for DL transmission is called a DL subframe. As a different meaning, the UD subframe indicates a case that a neighboring cell performs UL transmission whereas a serving cell performs DL transmission. The UL and the DL subframe indicate a case that the serving cell and the neighboring cell have an identical transmission direction.

In case of the UD subframe, although the UD subframe is identical to a legacy DL subframe in that a downlink signal is transmitted, antenna configuration, RS configuration and the like may change. Regarding this, it shall be described with reference to FIG. 8 in the following.

Figure 8:
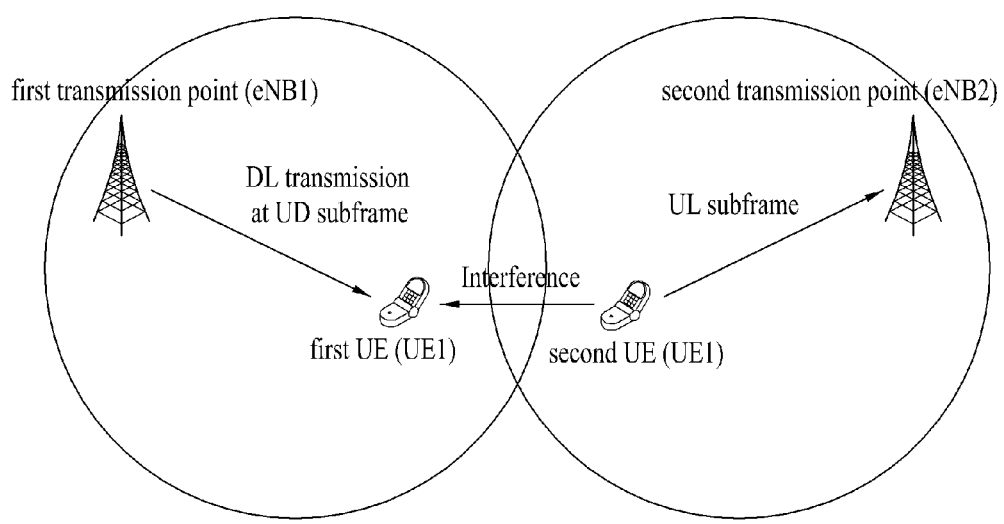
FIG. 8 is a diagram for explaining a relation with a neighboring cell and/or a user equipment in case of using a subframe configured for uplink to transmit a downlink signal in TDD.

FIG. 8 shows a first transmission point (eNB1), a second transmission point (eNB2) a first user equipment (UE1) belonging to the first transmission point and a second user equipment (UE2) belonging to the second transmission point. A situation shown in FIG. 8 indicates that the first transmission point transmits a DL signal in a UD subframe and the second transmission point receives a UL signal from the second user equipment in a UL subframe according to a UL-DL configuration identical to that of the first transmission point. In particular, FIG. 8 shows that the use of the UD subframe corresponds to a cell-specific operation. Yet, it is not mandatory to cell-specifically configure/use the UD subframe. Subsequently, in the situation shown in FIG. 8, when the first user equipment receives the DL signal from the first transmission point via the UD subframe, the first user equipment may experience strong interference due to UL signal transmission of the neighboring second user equipment.

And, although it is not depicted, transmission of the DL signal transmitted from the first transmission point via the UD subframe may affect the UL transmission transmitted by the neighboring cell.

As mentioned in the foregoing description, since the DL signal transmitted from the UD subframe may affect transmission and reception of a signal transmitted and received by a different transmission point or a user equipment, it may use a RS configuration, antenna configuration and the like different from a general DL subframe. Hence, if the configuration related to the signal transmission in the DL subframe is modified, it is necessary to inform the user equipment of the modification. In other word, an eNode B can transmit information on a DL subframe for the UD subframe (applied to the UD subframe). In the following, as mentioned in the foregoing description, a configuration change related to signal transmission in the UD subframe and transmission of information related to the configuration change are explained.

Change of CRS Configuration and Signaling Related to the Change

As mentioned in the foregoing description, since a channel state in a UD subframe may be different from a channel state in a DL subframe, a CRS configuration different from that of a normal DL subframe can be used in the UD subframe. In this case, the CRS configuration different from the CRS configuration of the normal DL subframe indicates a case that no CRS is transmitted in the UD subframe.

For a user equipment receiving the UD subframe, an eNode B can include whether a CRS exists in the UD subframe in information related to a downlink subframe used for the UD subframe. If the information indicates that a CRS is transmitted/exists, it is able to assume that the user equipment has a CRS configuration identical to that of the DL subframe. On the contrary, if the information indicates that a CRS does not exist, the user equipment may assume that a DMRS-based transmission is performed in the UD subframe. Yet, in this case, it is necessary for the eNode B to signal DMRS configuration for the UD subframe to the user equipment. The DMRS configuration may include such information as a DMRS port, a scrambling sequence parameter and the like.

The eNode B can signal a resource region to which a CRS is transmitted in a UD subframe. To this end, a CRS transmission region can be signaled in a manner of being divided into a MBSFN subframe and a non-MBSFN subframe. This means that a UL subframe (on SIB configuration) may become a configuration target of the MBSFN subframe for a case that the UL subframe is used as the UD subframe. Or, this means that a region to which a CRS is transmitted is divided into a subframe (PDSCH+PDCCH) and a control region (PDCCH). An indication of a region to which a CRS is transmitted can be performed in an OFDM symbol unit (e.g., transmission of a CRS in time domain can be restricted to a specific OFDM symbol(s)). If a CRS is transmitted on a partial band (e.g., 6 RBs situating at the center of whole bandwidth and the like) among frequency bandwidths on the UD subframe, it is able to signal a resource region on frequency domain.

An eNode B can signal which CRS port is transmitted in the UD subframe. This signaling can be performed under a premise that the number of CRS port in a normal DL subframe is different from the number of CRS port in the UD subframe (e.g., the number of CRS port in the UD subframe may correspond to a subset of the number of CRS port in the DL subframe). In particular, this signaling may correspond to a case that a CRS is transmitted but it is not used for the purpose of demodulation. (e.g., a CRS may be used for the purpose of tuning timing in time/frequency domain only.) In this case, since CRS overhead is reduced, it is able to obtain coding gain.

Change of Transmit Power and Signaling Related to the Change

Transmit power of PDSCH or an RS in a UD subframe can be configured in a manner of being different from transmit power in a normal DL subframe. More specifically, since a channels state of the UD subframe is different from a channel state of the normal DL subframe, a PDSCH-to-RS power ratio different from that of the DL subframe can be used. As an example, the PDSCH-to-RS power ratio in the UD subframe may be greater than the PDSCH-to-RS power ratio in the DL subframe. In this case, the PDSCH-to-RS power ratio corresponds to information necessary for demodulating high order modulation such as 16QAM, 64QAM and the like. The PDSCH-to-RS power ratio is used to precisely know a decision boundary in case of demodulating 16QAM and 64QAM.

In this case, an eNode B can include the PDSCH-to-RS power ratio for the UD subframe in information on a downlink subframe for the UD subframe. In this case, the RS may correspond to a CRS or a DMRS. When the information on the aforementioned power ratio is delivered, it may correspond to a UD subframe-specific channel state resulted from interference and the like due to uplink transmission of a user equipment (e.g., a second UE in FIG. 8) positioned at a cell boundary and belonging to a neighboring cell. In particular, RS power boosting/borrowing and the like can be UD subframe-specifically implemented. (Yet, unlike the aforementioned, the PDSCH-to-RS power ratio in the UD subframe may be used by a form defined in advance.)

Change of Configuration Associated with Channel Estimation and Signaling Related to the Change An RS of a previous DL subframe can be configured not to be used for channel estimation of a current UD subframe in a UD subframe. More specifically, conventionally, in order to increase accuracy of channel estimation via RS leveling (i.e., increasing RS density) in such a poor channel state as a low SNR or in order to early decode PDCCH, an RS of a previous subframe was able to be used for channel estimation of a current subframe when a DL subframe is contiguously allocated. Yet, as mentioned in the foregoing description, since RS configuration in the UD subframe may be different from that of the DL subframe, the RS of the previous DL subframe may not be used for the channel estimation of the current subframe.

In this case, an eNode B can signal to a user equipment for whether channel estimation using the RS of the previous DL subframe is feasible in the UD subframe. Or, if it is considered as CRS configuration of the previous DL subframe is identical to that of the current UD subframe, the eNode B can signal to the user equipment that the RS of the previous DL subframe is usable. As a specific example, the eNode B can indicate the user equipment to perform channel estimation using an RS of a current UD subframe only in the UD subframe.

Change of MCS (Modulation and Coding Scheme) and Signaling Related to the Change An eNode B can signal to a user equipment for an MCS used in a UD subframe. This signaling can be done in a DL subframe previous of a UD subframe. Having received the signaling, the user equipment may operate in the corresponding MCS only in the UD subframe (until a new MCS is signaled).

Measurement and Signaling Related to the Measurement

In relation to measurement (for RRL, RLM, CSI and the like), in particular, in relation to interference measurement, interference of a current subframe can be obtained in a manner of leveling interference measured in many subframes in general. Yet, in case of a UD subframe, as mentioned in the foregoing description, interference of the UD subframe may be differentiated from that of a DL subframe since channel situation is different from each other. Hence, conventional leveling of interference measured in many subframes may not be appropriate.

Hence, an eNode B can signal information on a subframe set (or time interval) used for interference measurement. This can be comprehended as signaling of an IMR (interference measurement resource) for the UD subframe.

Along with or independently, the eNode B can signal to the user equipment that interference measured in the UD subframe is to be considered as interference of the UD subframe only. Or, the eNode B can signal to the user equipment that interference on the UD subframe to be leveled only in a specific time interval. This can be useful in a situation that frequency of the UD subframe is low and a channel state (UL transmission of a neighboring cell and the like) is rapidly changing.

Together with the aforementioned information on the subframe set or independent from the information, the eNode B can signal RS configuration to be used for interference measurement in the UD subframe. In this case, the RS may correspond to such a reference signal capable of specifying as a CRS, a DMRS and the like.

Change of Transmission Mode and Signaling Related to the Change

Due to a change of a channel state, it may be preferable to use a transmission mode different from that of a DL subframe immediately before a UD subframe. In particular, the transmission mode of the UD subframe and the transmission mode of the DL subframe can be independently determined.

Hence, an eNode B can signal a transmission mode capable of being used/to be used by the UD subframe. For instance, in case that transmission of a closed-loop MIMO scheme is performed in the DL subframe and transmission of a transmit diversity scheme is performed in the UD subframe, a user equipment may be aware of which transmission mode is used in the UD subframe in advance via the signaling.

Yet, a change of a transmission mode can be indicated by a following implicit method without depending on the aforementioned explicit signaling.

For instance, if it is assumed that a CRS is not transmitted or if it is signaled that a CRS is not transmitted, it may assume that a user equipment operates in a DMRS-based transmission mode (e.g., a transmission mode 9) in a UD subframe.

Meanwhile, a transmission mode usable in the UD subframe may be limitative. For instance, if a CRS is not transmitted in the UD subframe, the transmission mode may be limited to the DMRS-based transmission mode only. In particular, a transmission mode 9 and 10 can be signaled as the transmission mode for the UD subframe only. If a CoMP operation is considered, the transmission mode 10 can also be excluded from the transmission mode for the UD subframe. This is because if the UD subframe is dynamically used in the CoMP operation, a smooth operation may be deteriorated. The limitation of the transmission mode can be indicated via upper layer signaling. Or, (if a CRS is not transmitted in the UD subframe) it is able to define to use the DMRS-based transmission mode (e.g., transmission mode 9) only in advance. A transmission mode is signaled to a user equipment via RRC signaling and the user equipment can recognize that a transmission mode different from the RRC signaled transmission mode may be used in corresponding subframes although a transmission mode for a subframe in which a usage of the subframe changes is not separately signaled. For instance, the transmission mode 9 only can be applied to a subframe in which a usage of the subframe has changed from UL to DL. Or, the transmission mode 9 or the transmission mode 10 can be used in the corresponding subframe and the user equipment can induce an actually used transmission mode from the subframe via blind decoding and the like. Or, a transmission mode of a subframe in which the usage of the subframe changes can be signaled in a manner of adding a new field to RRC signaling indicating the transmission mode or performing additional upper layer signaling.

Change of CQI (Channel Quality Information) Assumption and Signaling Related to the Change Assumption for CQI may be different from a normal DL subframe in a UD subframe. To help understanding, a process of bringing out CQI (CQI index) is explained first and then a UD subframe-specific CQI assumption according to embodiment of the present invention is explained. In order to bring out a CQI index, a user equipment selects a best PMI for each rank using a PMI (precoding matrix index) codebook and calculates SINR per layer for each PMI according to each rank. And, the user equipment calculates SINR per codeword (CW) using a 'CodeWord-to-layer mapping rule' and then calculates spectrum efficiency (SE) satisfying BLER 10% in each SINR. The user equipment calculates throughput per codeword using PDSCH $N_{RE}$ (the number of available RE for PDSCH) and the SE. Based on this, the user equipment calculates total throughput according to each rank. An RI is determined by selecting a greatest throughput and a rank including the greatest throughput. Subsequently, a nearest CQI index is brought out in a manner of comparing values resulted from multiplying the PDSCH $N_{RE}$ by the SE among CQI table with the above-determined throughput.

In the process of bringing out the aforementioned CQI index, there exist several assumptions for the PDSCH $N_{RE}$. For instance, the assumptions include that PDCCH is transmitted using 3 OFDM symbols and a CRS RE is mapped according to a configuration of a non-MBSFN subframe.

In this case, as mentioned in the foregoing description, since a downlink signal is able to be transmitted in a UD subframe under a configuration different from that of a general DL subframe, assumption for calculating a CQI index in the UD subframe may also vary as follows. (This may means that assumption of a user equipment for CQI calculation in a normal DL subframe (i.e., a subframe configured by DL in SIB and the subframe where an actual DL transmission is performed) may be different from assumption of the user equipment for the CQI calculation in a UD subframe (for an identical user equipment)).

First of all, since a CRS may not be transmitted for the purpose of reducing eNB-to-eNB interference from a UD subframe to a neighboring cell, assumption associated with the CRS can be assumed in a manner that the CRS is not transmitted in case of bring out a CQI index in the UD subframe. If a CRS configuration changes in corresponding subframes by upper layer signaling and the like, it is able to assume the number of CRS RE based on the signaling.

Secondly, assumption associated with PDCCH is explained in the following. When CQI for a UD subframe is calculated, if a CRS is not transmitted, it is not possible to transmit PDCCH performing CRS-based transmission. Hence, a user equipment may assume that there is no PDCCH transmission. Or, it may assume that PDSCH is transmitted from a first OFDM symbol of a subframe. Or, if a starting symbol of PDSCH is signaled as shown in a transmission mode 10, it is able to assume the number of PDCCH symbol (or the number of PDSCH symbol) based on the signaling.

Thirdly, a user equipment can assume DMRS overhead based on a rank (i.e., reported rank) for a UD subframe prior to a current UD subframe. In particular, if a CSI process for a UD subframe is separately defined, the DMRS overhead can be assumed based on a most recently reported rank in the CSI process. For instance, if a rank of a last UD subframe prior to the current UD subframe corresponds to 1, 2, it is able to assume DMRS overhead of 12 REs. If the rank corresponds to 3, 4, it is able to assume DMRS overhead of 24 REs.

Fourthly, a user equipment can assume a downlink power allocation different from that of a DL subframe in a UD subframe. For instance, in case of configuring a transmission mode 2 or 3, which means a transmit diversity scheme, via upper layer signaling and the like and in case of configuring 4-port CRS, power allocation ($\rho_A = P_A + \Delta_{offset} + 10 \log_{10}(2)$) allocated in case of applying the transmit diversity scheme of 4-port CRS can be applied to the DL subframe. Yet, since a CRS is not transmitted in the UD subframe, in case of using a DMRS-based transmission mode, it is able to assume a value (e.g., $\rho_A = P_A + \Delta_{offset}$) different from a power ratio used to be applied to a subframe, which is an originally DL subframe, for CQI calculation despite that the transmission mode 2 or 3 is configured to the user equipment via the RRC.

Fifthly, a user equipment may assume transmission modes different from each other according to a subframe to which a CQI being brought out is applied.

Signaling of an eNode B indicating various configuration changes of the UD subframe, i.e., information on a downlink subframe for the UD subframe (information on the downlink subframe applied to the UD subframe) can be delivered to a user equipment via such a method as RRC signaling, MAC layer signaling, physical layer signaling or the like. For instance, in case of intending to use a semi-static configuration in the UD subframe, upper layer signaling can be used. On the contrary, in case of using a dynamic configuration to which a channel state is actively reflected, physical layer signaling can be used. In this case, the physical layer signaling may use a 'pre-scheduling' scheme delivering information on the UD subframe via PDCCH, E-PDCCH and the like of a DL subframe (e.g., a DL subframe transmitted prior to the UD subframe and the like) adjacent to the UD subframe. And, information on the expiration date of the information related to the downlink subframe can be transmitted together. For instance, if the information related to the downlink subframe is dynamically delivered via PDCCH/E-PDCCH of the DL subframe, which is transmitted prior to a corresponding UD subframe, the information related to the downlink subframe can be signaled together with the information associated with the expiration date indicating that the information on the downlink subframe is valid for the prescribed number of UD subframes from the corresponding UD subframe.

Figure 9:
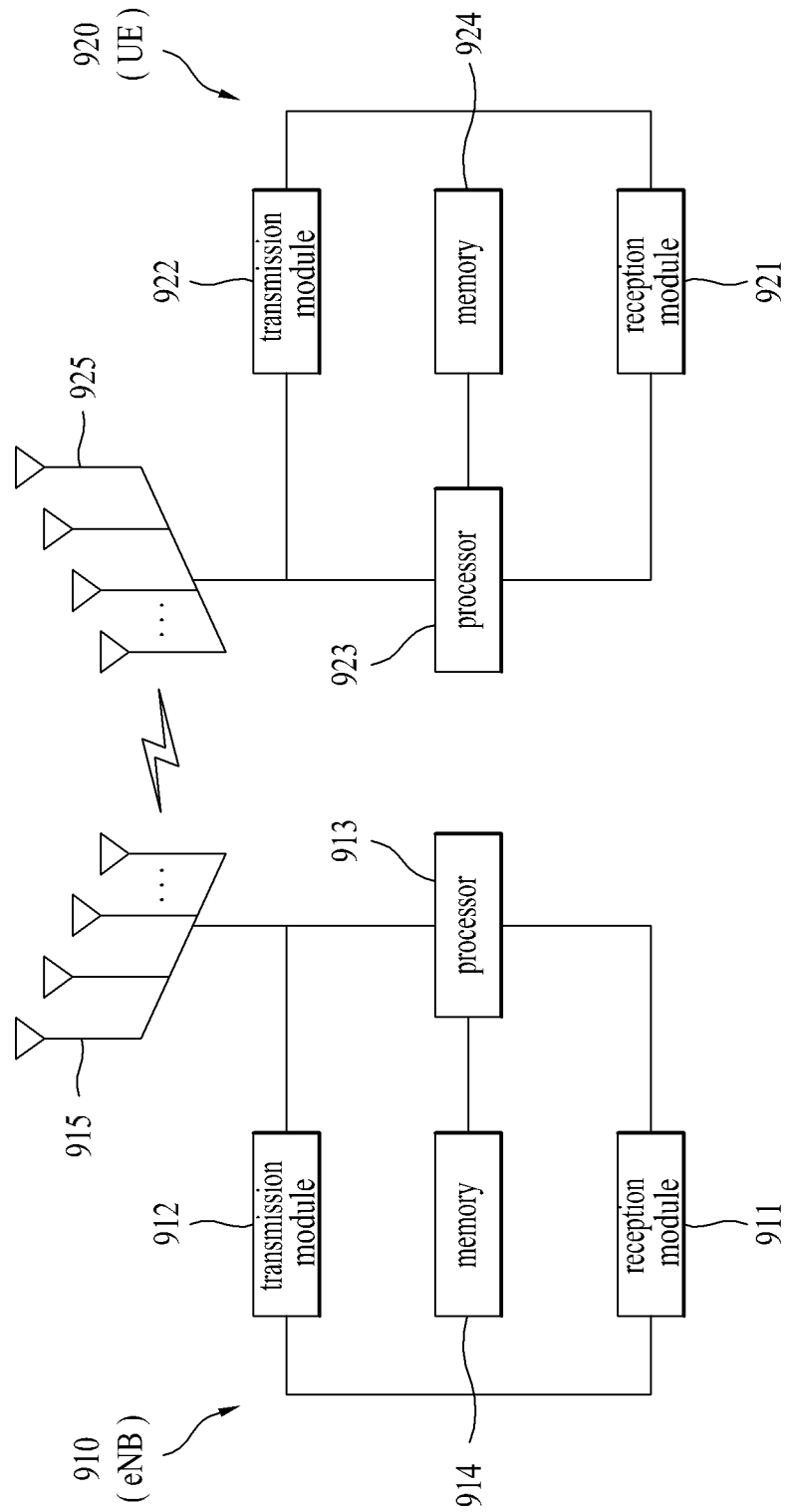
FIG. 9 is a diagram for a configuration of a transmission and reception device.

FIG. 9 is a diagram for a configuration of a transmission and reception device.

Referring to FIG. 9, a transmission point device 910 according to the present invention can include a reception module 911, a transmission module 912, a processor 913, a memory 914, and a plurality of antennas 915. A plurality of the antennas 915 means the transmission point device capable of supporting MIMO transmission and reception. The reception module 911 can receive various signals, a data, and information in UL from the UE. The transmission module 912 can transmit various signals, a data, and information in DL to the UE. The processor 913 can control overall operations of the transmission point device 910.

The processor 913 of the transmission point device 910 according to one embodiment of the present invention can operate to implement the aforementioned embodiment of the present invention.

Besides, the processor 913 of the transmission point device 910 is configured to perform a function of processing information received by the transmission point device 910, information to be transmitted to an external, and the like. The memory 914 is configured to store the processed information for a prescribed time and can be substituted by such a configuration element as a buffer (not depicted), or the like.

Subsequently, referring to FIG. 9, the UE 920 according to the present invention includes a reception module 921, a transmission module 922, a processor 923, a memory 924, and a plurality of antennas 925. A plurality of the antennas 925 means the UE capable of supporting MIMO transmission and reception. The reception module 921 can receive various signals, a data, and information in DL from the transmission point. The transmission module 922 can transmit various signals, a data, and information in UL to the transmission point. The processor 923 can control overall operations of the UE 920.

The processor 923 of the UE 920 according to one embodiment of the present invention can operate to implement the aforementioned embodiment of the present invention. Besides, the processor 923 of the UE 920 is configured to perform a function of processing information received by the UE 920, information to be transmitted to an external, and the like. The memory 924 is configured to store the processed information for a prescribed time and can be substituted by such a configuration element as a buffer (not depicted), or the like.

Detail configuration of the transmission point device and the UE can be implemented to independently apply the aforementioned contents explained in various embodiments of the present invention or to simultaneously apply two or more embodiments. The overlapped contents are omitted for clarity of explanation.

And, in explaining FIG. 9, explanation on the transmission point device 910 can be identically applied to a relay device as a main agent of DL transmission or a main agent of UL reception. Explanation on the UE 920 can be identically applied to a relay device as a main agent of DL reception or a main agent of UL transmission. Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like. In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

Embodiments of the present invention mentioned in the foregoing description can be applied to various wireless communication systems.

What is claimed is:

1. A method for transmitting, by an eNode B, a downlink signal in a wireless communication system, the method comprising:
transmitting information associated with a downlink subframe; and
transmitting the downlink signal via an uplink subframe configured to transmit the downlink signal,
wherein the information associated with the downlink subframe comprises information indicating whether a cell-specific reference signal is transmitted via the uplink subframe and information on a physical downlink shared channel (PDSCH) to reference signal (RS) power ratio of the uplink subframe, and
wherein the PDSCH to RS power ratio is determined based on an uplink interference signal of a user equipment (UE) belonging to a neighboring cell.

2. The method of claim 1, wherein whether the uplink subframe is configured for uplink transmission is indicated to a user equipment (UE) via a system information block, and
wherein the uplink subframe to which the downlink signal is transmitted and configured for the uplink transmission, corresponds to a subframe capable of being configured as a multimedia broadcast single frequency network (MBSFN) subframe.

3. The method of claim 1, wherein the information associated with the downlink subframe further comprises antenna port information of a transmitted cell-specific reference signal when the downlink signal is transmitted via the uplink subframe.

4. The method of claim 3, wherein the antenna port information corresponds to a subset of antenna port information of the cell-specific reference signal transmitted in a subframe configured for downlink transmission.

5. The method of claim 1, wherein the uplink interference signal corresponds to an average of an interference signal measured in the uplink subframe configured to transmit the downlink signal.

6. The method of claim 1, wherein the PDSCH to RS power ratio corresponds to a value greater than a PDSCH to RS power ratio in a subframe configured for downlink transmission.

7. The method of claim 1, wherein the information associated with the downlink subframe further comprises subframe set information used for an interference measurement of a user equipment (UE), which has received the downlink signal.

8. The method of claim 7, wherein the subframe set information corresponds to a set of subframes used for downlink transmission and configured for the uplink transmission.

9. The method of claim 1, wherein the information associated with the downlink subframe further comprises at least one of a transmission mode for transmitting the downlink signal and a modulation and coding scheme (MCS) in the subframe configured for uplink transmission.

10. The method of claim 1, wherein a user equipment (UE)-specific reference signal overhead in the subframe configured for uplink transmission is determined based on a rank of a subframe used for transmitting a downlink signal among subframes configured for uplink transmission prior to the subframe configured for the uplink transmission.

11. The method of claim 1, wherein the information associated with the downlink subframe is transmitted in a downlink subframe prior to the subframe configured for the uplink transmission where the downlink signal is transmitted.

12. The method of claim 1, wherein the information associated with the downlink subframe is transmitted via upper layer signaling.

13. An eNode B device in a wireless communication system, the eNode B device comprising:
a transmission module; and
a processor configured to:
transmit information associated with a downlink subframe, and
transmit a downlink signal via an uplink subframe configured to transmit the downlink signal,
wherein the information associated with the downlink subframe comprises information indicating whether a cell-specific reference signal is transmitted via the uplink subframe and information on a physical downlink shared channel (PDSCH) to reference signal (RS) power ratio of the uplink subframe, and
wherein the PDSCH to RS power ratio is determined based on a uplink interference signal of a user equipment (UE) belonging to a neighboring cell.

* * * * *